(12) United States Patent
Smith et al.

(10) Patent No.: US 6,893,582 B2
(45) Date of Patent: May 17, 2005

(54) METHOD OF HEATING A FLUID USING A LINE HEATER COMPRISING AN ALKALI METAL FORMATE

(75) Inventors: Kevin W. Smith, McMurray, PA (US); John H. Hallman, New Waverly, TX (US); Lori Acor, Houston, PA (US); Joseph Miller, Aliquippa, PA (US)

(73) Assignee: Clearwater International, L.L.C., Houston, TX (US)

( * ) Notice: Subject to any disclaimer, the term of this patent is extended or adjusted under 35 U.S.C. 154(b) by 629 days.

(21) Appl. No.: 09/788,115

(22) Filed: Feb. 16, 2001

(65) Prior Publication Data

US 2002/0003223 A1 Jan. 10, 2002

Related U.S. Application Data

(60) Provisional application No. 60/184,146, filed on Feb. 22, 2000.

(51) Int. Cl.[7] .................................................. C09K 5/00
(52) U.S. Cl. .............................. 252/76; 252/77; 252/79
(58) Field of Search .............................. 62/434; 252/75, 252/76, 77, 79

(56) References Cited

U.S. PATENT DOCUMENTS

| | | |
|---|---|---|
| 3,742,096 A | 6/1973 | Spivack |
| 3,901,715 A | 8/1975 | Callahan et al. |

(Continued)

FOREIGN PATENT DOCUMENTS

| | | |
|---|---|---|
| DE | 44 31 233 | 3/1995 |
| DE | 196 04 102 | 7/1997 |
| GB | 6069620 | 8/1948 |
| GB | 716598 | 10/1954 |
| GB | 903885 | 8/1962 |
| GB | 1 585 265 | 2/1981 |
| SU | 1 786 233 | 1/1993 |
| WO | WO 95/29371 | 11/1995 |
| WO | WO 96/39472 | 12/1996 |
| WO | WO 97/01612 | 1/1997 |
| WO | WO 99/37733 | 7/1999 |
| WO | WO 01/81497 | 11/2001 |
| WO | WO 01/94494 | 12/2001 |
| WO | WO 01/96723 | 12/2001 |
| WO | WO 03/012001 | 2/2003 |

OTHER PUBLICATIONS

Alco Gas & Oil Production Equipment Ltd., "Designed and Manufactured Products Heaters", Internet Article, retrieved from the internet on Mar. 21, 2003, last modified on Dec. 21, 2000.

PCT Communication, Application No. 01 117 050.3–1218, Apr. 3, 2003.

Campbell, "Gas Conditioning and Processing", V. 2 Sixth Edition, 1988 pp 82–86.

Alco Gas & Oil Production Equipment Ltd., "Designed and Manufactured Products Heaters", Internet Article, retrieved from the internet on Mar. 21, 2003, last modified on Dec. 21, 2000.

XP–002249817, Derwent Publications Ltd., GB; AN 1994–033101, Section Ch, Week 199404 (English translation of the Abstract for foreign patent SU 1786020A1).

Aittomaki A., et al., Potassium Formate As A Secondary Refrigerant, International Journal of Refrigeration, pp. 276–282, vol. 20, No. 4, Jun. 1997.

PCT International Search Report, International Application No. PCT/GB/03/10643, dated Aug. 25, 2003.

*Primary Examiner*—Necholus Ogden
(74) *Attorney, Agent, or Firm*—Moser, Patterson & Sheridan (57) ABSTRACT

A heat transfer fluid comprising potassium formate is used to good effect in line heaters for heating natural gas in gas transmission lines, and for other uses. The solution is heated in a liquid heat transfer medium in a fluid heating zone and transferred to a gas heating zone.

29 Claims, 8 Drawing Sheets

$Q_1$ = Heat flow, fire to fire tube $Q_2$ = Heat flow, fire tube to fluid $Q_3$ = Heat flow, across fluid $Q_4$ = Heat flow, fluid to process coil $Q_5$ = Heat flow, process coil to gas

U.S. PATENT DOCUMENTS

| | | |
|---|---|---|
| 3,950,950 A | 4/1976 | Doerner et al. |
| 3,952,051 A | 4/1976 | Ogawa et al. |
| 3,962,874 A | 6/1976 | Doerner |
| 4,105,592 A | 8/1978 | Collins |
| 4,117,794 A | 10/1978 | Sjogren |
| 4,153,473 A | 5/1979 | Resenberg et al. |
| 4,192,760 A | 3/1980 | Junger et al. |
| 4,355,079 A | 10/1982 | Rosenberg et al. |
| 4,372,932 A | 2/1983 | Hass |
| 4,444,672 A | 4/1984 | Gancy |
| 4,537,694 A | 8/1985 | Horodysky |
| 4,581,039 A | 4/1986 | Horodysky |
| 4,849,119 A | 7/1989 | Horodysky |
| 4,954,279 A | 9/1990 | Ma et al. |
| 5,064,551 A | 11/1991 | Smith |
| 5,104,562 A * | 4/1992 | Kardos et al. ............ 252/79 |
| 5,131,233 A | 7/1992 | Cray et al. |
| 5,334,323 A | 8/1994 | Schrimpf et al. |
| 5,380,706 A | 1/1995 | Himes et al. |
| 5,390,505 A | 2/1995 | Smith et al. |
| 5,398,497 A | 3/1995 | Suppes |
| 5,435,930 A | 7/1995 | Chan et al. |
| 5,555,738 A | 9/1996 | DeVault |
| 5,635,458 A | 6/1997 | Lee et al. |
| 5,725,637 A | 3/1998 | Gavlin et al. |
| 5,759,436 A | 6/1998 | Schrimpf et al. |
| 5,772,912 A | 6/1998 | Lockyer et al. |
| 5,846,450 A | 12/1998 | Atkinson ............ 252/69 |
| 5,853,458 A | 12/1998 | Gavlin et al. ............ 95/231 |
| 5,935,488 A | 8/1999 | Wiesenfeld et al. |
| 5,993,684 A | 11/1999 | Back et al. |
| 6,058,695 A | 5/2000 | Ranasinghe et al. |
| 6,059,989 A | 5/2000 | Stankowiak et al. |
| 6,059,996 A * | 5/2000 | Minks et al. ............ 252/395 |
| 6,156,226 A | 12/2000 | Klyosov et al. |
| 6,195,997 B1 | 3/2001 | Lewis et al. |
| 6,221,276 B1 | 4/2001 | Sarin |
| 6,239,183 B1 | 5/2001 | Farmer et al. |
| 6,287,480 B1 | 9/2001 | Berglund et al. |
| 6,301,897 B1 | 10/2001 | Uchida |
| 6,321,552 B1 | 11/2001 | Frederiksen |
| 6,368,384 B1 | 4/2002 | Smith |
| 6,470,686 B2 | 10/2002 | Pierson |
| 2002/0003223 A1 | 1/2002 | Smith et al. |
| 2003/0034478 A1 | 2/2003 | Stanley et al. |
| 2004/0006966 A1 | 1/2004 | Hallman et al. |

* cited by examiner

Fig.1 PRIOR ART $Q_1$ = Heat flow, fire to fire tube $Q_2$ = Heat flow, fire tube to fluid $Q_3$ = Heat flow, across fluid $Q_4$ = Heat flow, fluid to process coil $Q_5$ = Heat flow, process coil to gas

Comparison of the thermal conductivities of water, glycols, and potassium formate solution.

Fig. 4

Comparison of the kinematic viscosities of glycol solutions and potassium formate solution.

Fig. 5

Comparison of the specific heat capacities of glycol solutions and water with potassium formate solution.

Fig. 6

Comparison of volume-based heat capacity of glycols, water and potassium formate solution.

Fig. 7

Comparison of thermophysical parameters and film coefficients between glycol solutions and potassium formate solutions, showing the improvement in heat transfer from the new fluid.

Fig. 8

Overall heat transfer in electric line heater test, comparing potassium formate solution with water and glycol solutions.

METHOD OF HEATING A FLUID USING A LINE HEATER COMPRISING AN ALKALI METAL FORMATE

RELATED APPLICATION

This application is based upon and incorporates all of the disclosure, exhibits, and claims, of Provisional Application Ser. No. 60/184,146 filed Feb. 22, 2000, and claims the benefit if its filing date.

TECHNICAL FIELD

This invention relates generally to heat transfer and the heating of fluids through the use of a heat transfer medium which is a solution comprising an effective amount of potassium formate, optionally with ammonium or an alkali metal formate other than potassium, and further optionally together with an alkali metal or ammonium acetate and/or other additives. In particular, such heat transfer solutions are used where the material to be heated is not in direct contact with the heat transfer solution. It also relates specifically to the use of such solutions in line heaters for heating natural gas in natural gas transmission lines, and for similar uses.

BACKGROUND OF THE INVENTION

In the past, various fluids have been used as heat exchange media for heating other fluids such as air, water and natural gas. At present, probably the type of heat exchange medium most commonly used in gas transmission lines, for example, is a glycol such as ethylene glycol, diethylene glycol, triethylene glycol, or a mixture of them. These are favored because they not only have good heat exchange properties but also have low freezing points and/or can depress the freezing points of mixtures with water. A low freezing point is desirable during periods when the heat exchange fluid is idle, or it leaks, is outdoors in storage, or it is removed from the system for any reason. At present, ethylene glycol (EG) is probably the heat exchange fluid most commonly used in heaters for the natural gas in gas transmission lines. Such heaters are most commonly called line heaters.

Prior to the present invention, line heaters have been placed between compressing stations on gas transmission lines. Heating the gas in remote locations on a gas transmission line and/or between compression stations has more than one beneficial effect. First, the heater assists in moving the gas through successive pumping or compression stations by adding energy to it, reducing the density, and utilizing the tendency to expand to assist in the forwarding of the gas from station to station. Second, heating minimizes the tendency of moisture to condense from the gas on cooling. Liquid moisture in the pipeline is undesirable not only because it can facilitate corrosion but also because it can freeze and sometimes cause blockages or resistance to flow.

Figure 1:
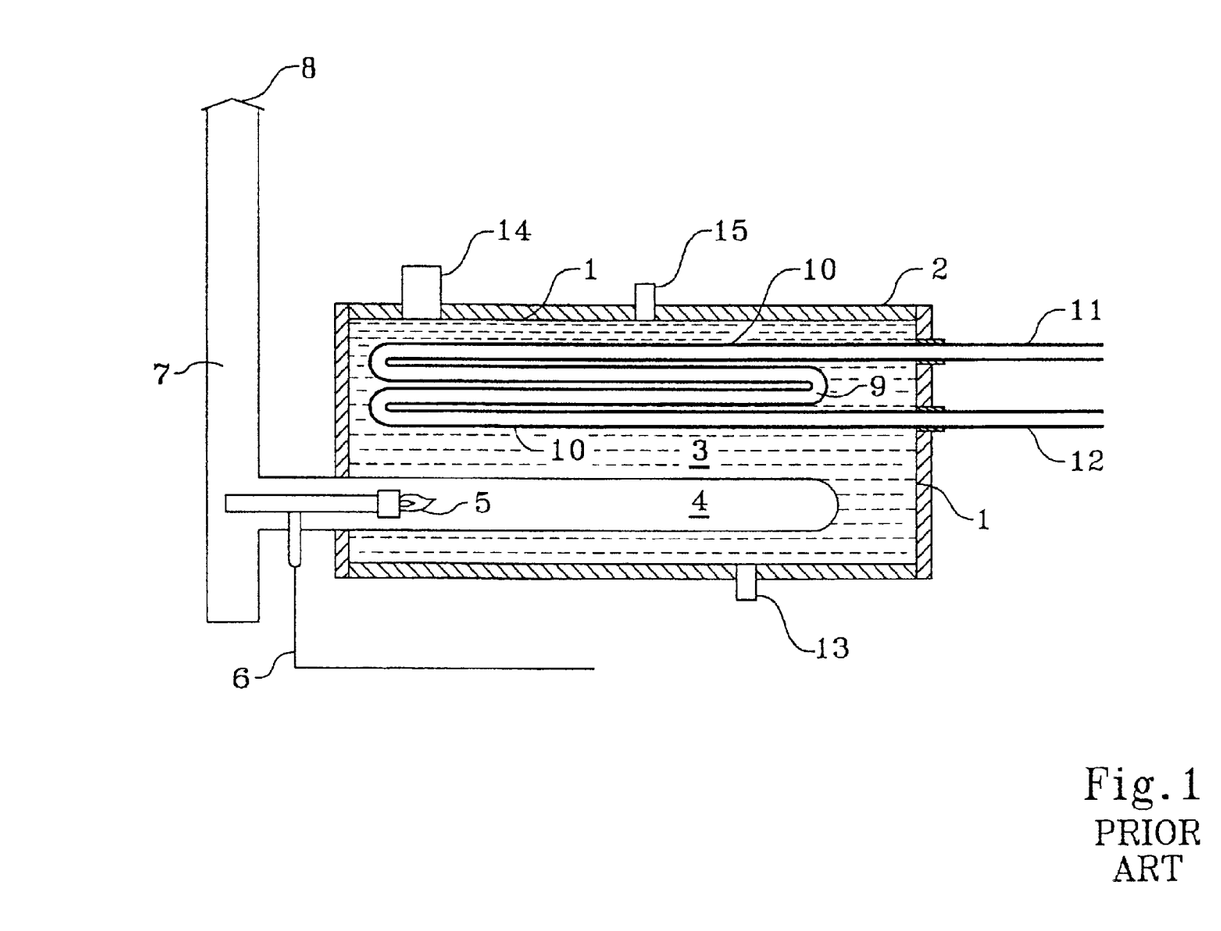
FIG. 1 is a side sectional view of a simplified prior art line heater.

Exemplary line heaters are known in the art and are described in "Gas Conditioning and Processing—The Equipment Modules", pages 82–86, originally attached as Exhibit A as part of Provisional Application Ser. No. 60/184, 146. The line heaters employ coils, tubes, or other means for segregating the heat exchange fluid from the natural gas, and may be either direct fired or indirect fired. We prefer to use indirect fired line heaters, in which a source of heat such as a firetube is held within a vessel also including a coil and/or tubes for circulating the natural gas to be heated. The heat transfer fluid occupies a substantial volume in the vessel. After it is heated by the firetube in the heat exchange fluid heating zone, the heat exchange fluid is transported to a gas heating zone, where the coil and tubes are heated containing the circulating gas. The tubes can be substantially horizontal, radial, or any other configuration for efficient heat transfer, and may be made from various materials generally chosen for their heat exchange properties, as is known in the art. FIG. 1, based on Exhibits B and C of Provisional Application Ser. No. 60/184,146, depicts a common design for an indirect heater as known in the art.

Alternatively, the heat exchange fluid may be contained within coils, tubes, and/or other containers which are usually heated by flame in a heating zone, and circulated within the coils, tubes or the like to a natural gas heating zone, where the heated fluid gives up its thermal energy to the natural gas. It is not essential that the original (heat transfer fluid) heating zone be near the gas heating zone, and in fact the two heating zones can be in separate pieces of equipment while the heat transfer fluid is moved from one zone to the other. The heat exchange fluid is more or less continuously circulated while the heating process is conducted. In other fluid heaters, pumps may be used to move the heat energy from its source through the heat exchange fluid to the fluid to be heated.

It is desirable to find an environmentally more acceptable material for the heat exchange fluid in line heaters and for other fluid heater applications because, when the heat exchange fluid is leaked even in relatively small quantities onto the earth during an accident or otherwise, the mishap must be reported to the Environmental Protection Agency and/or to other regulatory agencies, and resources must be diverted to correcting any problems caused by the leak.

The reader may be interested in reviewing U.S. Pat. No. 5,104,562 to Kardos et al, which describes aqueous combinations of potassium formate and potassium acetate for use as cooling compositions.

SUMMARY OF THE INVENTION

We have found that various solutions of alkali metal formates may be used as the heat exchange fluids in line heaters. In particular, we may use compositions as follows:
1. Solutions of 1% to 75% by weight potassium formate in water.
2. Aqueous solutions described in 1 together with at least one of (a) 0.01% to 40% by weight ammonium formate or an alkali metal formate other than potassium formate, or an alkali metal or ammonium acetate (b) an effective amount of a compatible corrosion inhibitor, sludge inhibitor, scale inhibitor, freeze point depressant or pH regulator. Potassium carbonate and/or potassium acetate may be used for their corrosion inhibiting properties; they will contribute to the heat transfer capabilities of the solution. In the preferred potassium formate solution of about 20% to about 50% by weight potassium formate, if potassium acetate is included, it is preferred that it not exceed about 10% by weight, but 0.01%–20% may be used for its heat transfer properties as well as its corrosion inhibiting properties.
3. Aqueous solutions as in 1, 2, or 3 also including up to 50% by weight of a low molecular weight (up to 6 carbon atoms) glycol. Where glycols are used, it is preferred to use 0.01% to 50% by weight ethylene or propylene glycol.
4. Solutions as recited in 1, 2, 3, or 4 wherein the alkali metal formate is made in situ by combining one or more alkali metal hydroxides with formic acid and/or where the potassium carbonate or potassium acetate for 3 is made in situ.

5. Any of the above solutions may include amounts of alkali metal halides calculated to improve the freeze resistance of the combination, that is, to lower the freeze point beyond the level of a solution of potassium formate alone.

Generally the solutions described above are used as heat transfer media by first heating them and then causing the heat so absorbed to be transferred to a fluid such as natural gas to be heated. This may involve heating them in a heat absorption zone, moving them to target fluid heating zone, and causing the heat energy in the heat transfer medium to be transferred to the target fluid. In this case, the heat transfer medium may be pumped or permitted to circulate naturally through convection. Alternately, the heat transfer medium remains in one place and the target fluid is circulated from a relatively cool zone to a relatively hot zone.

Thus our invention in one aspect is a method of heating a fluid comprising heating a solution comprising potassium formate as a heat exchange medium in a solution heating zone, moving the solution to a fluid heating zone to heat the fluid, and recirculating the solution to the solution heating zone. In another aspect, our invention is a method of transmitting natural gas in a natural gas pipeline comprising compressing the gas for transmission in a first pipeline segment to a line heater, receiving the gas in the line heater, heating the gas in the line heater using a solution comprising potassium formate as a heat exchange medium, and transmitting the gas through a second pipeline segment to a compressing station for further transmission.

DETAILED DESCRIPTION OF THE INVENTION

Heat transfer efficiency is most commonly measured by, among other criteria, an overall heat transfer coefficient U. In line heaters, in which the transfer of heat is governed by natural convection forces, the important physical parameters may be expressed as thermal conductivity in BTU's/(hrs·ft$^2$)/ft·° F., viscosity, in cP, density, in gm/mL, and specific heat capacity in BTU/(lb*° F.). Table I shows a comparison of these properties in two solutions of our invention as compared to two glycol solutions of the prior art:

TABLE 1

| Property | 50% propylene glycol | 50% Ethylene Glycol in water | 50% potassium formate in water | 37% potassium formate in water |
|---|---|---|---|---|
| Specific gravity, gm/cc | 1.046 | 1.076 | 1.40 | 1.28 |
| Viscosity @ 40° F., CP | 14.28 | 6.77 | 2.10 | 1.80 |
| Freeze point, ° F. | −28 | −29 | −55 | −50 |
| Thermal conductivity | @60 F. 0.208 @120 F. 0.217 | @60 F. 0.218 @120 F. 0.230 | @60 F. 0.26 @120 F. 0.28 | @60 F. 0.28 @120 F. 0.30 |
| Specific heat capacity | @60 F. 0.840 @120 F. 0.871 | @60 F. 0.780 @120 F. 0.811 | @60 F. 0.596 @120 F. 0.610 | @60 F. 0.734 @120 F. 0.765 |
| Volume expansion, 40° F. to 180° F., % by volume | 5.0 | 4.62 | 3.24 | 3.13 |

While the potassium formate solutions are roughly equivalent to the glycol solutions in terms of specific heat capacity, they are clearly superior to the glycol solutions, for heat exchange efficiency, in all of the other above properties. In addition, they are far more environmentally acceptable than the glycols.

Referring now to FIG. 1, a typical line heater as used in a natural gas transmission line is shown in side section as adapted from Exhibit B of our Provisional Application Ser. No. 60/184,146. The line heater comprises a shell 1 which may contain an insulation layer 2. Shell 1 forms an enclosure for heat exchange fluid 3, which substantially fills the enclosure. Near the bottom of shell 1 is a firetube 4, kept hot by burner 5, which is fed by fuel gas line 6. Fuel gas in line 6 may be equipped with a fuel gas scrubber, not shown, and various valves and regulators known in the art. Stack 7 assures good combustion and directs combustion products to vent 8, which may be fitted with emission treating apparatus not shown. Also within the enclosure formed by shell 1 is a coil 9, which may comprise elongated parallel tubes 10, having an inlet 11 and an outlet 12. The gas to be heated is passed into the inlet 11 from the gas transmission system not shown through the tubes 10 and coil 9, where it is heated by the heat exchange fluid 3. From outlet 12, the heated gas is returned to the gas transmission system or pipeline not shown. As is known in the art, the illustrated line heater works at least partly by convection—that is, the heat exchange fluid 3 is circulated without a pump, since the fluid 3 heated by firetube 4 rises within shell 1, contacts the relatively cool coil 9 and tubes 10, which absorb heat from the fluid 3, heating the gas in the tubes 10 and coil 9, and then tends to descend within shell 1, thus circulating within shell 1. Temperature, pressures and flows may be regulated as is known in the art. Shell 1 may be provided with drain 13, fill opening 14 and/or vent 15 for maintenance and/or replenishing the heat exchange fluid. When prior art heat exchange fluids are used on such line heaters, they may cause troublesome contamination of the earth, through leakage and otherwise. Our heat exchange fluid is far less problematic than prior art fluids but operates in substantially the same manner with, however, greater efficiency as will be seen in the data presented herein. We are not limited to its use in the particular illustrated line heater, which is a type of indirect line heater, but may use our heat exchange fluid in any gas heater in which fluid is heated in a fluid heating zone, moved to a gas heating zone, and circulated back to the fluid heating zone.

A more detailed analysis and explanation of our invention will benefit from a review of the physics of heat transfer in line heaters.

Heat Transfer Equations.

The transfer of heat in line heaters occurs by both conduction and convection pathways. A third type of heat transfer, radiation, is minimal in these systems and is not discussed.

Figure 2:
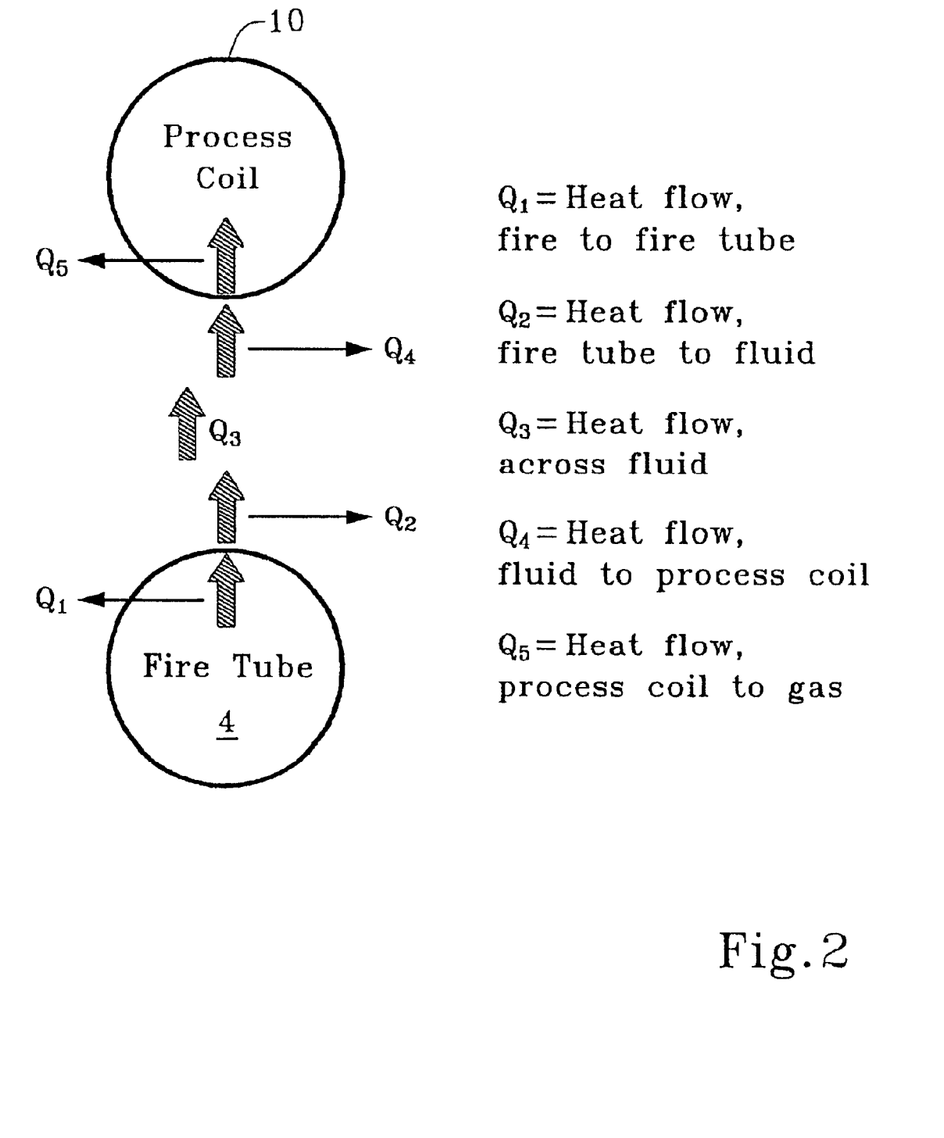
FIG. 2 is a diagram representing a transverse section of the line heater of FIG. 1, showing the movement of heat within the line heater.

The overall heat flow, $Q_{tot}$, is simply the sum of the individual heat transfer contributions at the various interfaces (solid/liquid) and across the liquid volume in the heater, as shown in FIG. 2 and described in Equation (1).

$$Q_{tot}=Q1+Q2+Q3+Q4+Q5 \quad (1)$$

As seen in FIG. 2, showing a cross section of a fire tube 4 and a symbolic parallel tube 10, $Q_1$ is the heat flow between the fire and fire tube 4, $Q_2$ is the flow between the fire tube 4 and the fluid near the fire tube 4, $Q_3$ the flow across the bulk fluid, $Q_4$ between the fluid and the process coil (parallel tube 10), and $Q_5$ is the heat moved from the process coil to the process stream, usually gas. $Q_1$ and $Q_5$ are virtually independent of fluid type, as they are a function of the design of the heat source, fire tube, process coil design, and flow rate of the gas. $Q_2$, $Q_3$ and $Q_4$ are related to fluid properties, with $Q_2$ and $Q_4$ transferring heat by both conduction and convection, and $Q_3$ moving heat largely by conduction.

Conduction.

The conduction contribution to heat transfer is defined by Equation (2), $$Q_{conduction}=-kA(\Delta T/\Delta X) \quad (2)$$

Where k is the thermal conductivity, A is the surface area, T is the temperature, and X is the distance over which the heat is transferred. Since X and A are determined by the design of the line heater, and $\Delta T$ is largely fixed by the nature of the process, the conductive heat transfer is therefore affected primarily by the thermal conductivity of the heat transfer fluid.

Convection.

The contribution of the convection process in heat transfer is significant mainly at the interfaces between the fluid system and the metal fire tube and process coil, on the hot and cold sides, respectively.

Convection heat transfer between the fire tube and the heat transfer fluid, and between the fluid and process coil is defined by Newton's Law of Cooling, Equation 3, $$Q_{convection}=hA\Delta T \quad (3)$$

Where A is the surface area, $\Delta T$ is the temperature difference between the metal surface and the bulk liquid temperature, and h is a constant of proportionality, called the convection heat transfer coefficient, or commonly the film coefficient. The value of h is determined by a fluid's physical and thermophysical properties.

Film Coefficients.

The value of h for any system can be determined experimentally by measuring the flow of heat across the system, and using known values for the temperature difference and surface area, but the contribution from a specific heat transfer interface can be difficult to separate from the overall heat transfer process. The film coefficient h can also be calculated using accepted relationships between a number of thermophysical parameters that describe free or natural convection, Equation (4), $$Nu=c(Gr*Pr)^y \quad (4)$$

Where Nu, Gr, and Pr are the Nusselt, Grashof, and Prandtl numbers, respectively. These are dimensionless numbers that describe the physical phenomena associated with convection heat transfer processes. The constant c and the power y are values associated with the geometry of the system, and with the type of fluid and convection process that is occurring. For line heaters using conventional fluids, as we are discussing here, c=0.129 and y=⅓.

To determine which thermophysical and physical parameters are important in comparing different heat transfer fluids, we must look at the component parts of Equation (4).

$$Nu=(h*L)/k \quad (5)$$

$$Gr=(g*\beta*\Delta T*L^3)/v^2 \quad (6)$$

$$Pr=(C_p*\mu)/k=(C_p*\rho*v)/k \quad (7)$$

Where h=film coefficient, BTU/hr*ft$^2$*° F.

L=characteristic length, ft (the distance the heat travels), ft k=thermal conductivity, BTU/(hr*ft$^2$)(° F./ft)

g=acceleration of gravity, ft/hr$^2$ $\beta$=thermal expansion coefficient, 1/° F.

$\mu$=viscosity, lb/(ft*hr)

v=kinematic viscosity, ft$^2$/hr $C_p$=specific heat capacity at a constant pressure $\rho$=density, lb/ft$^3$ Since Nu, Gr, and Pr are dimensionless, any internally consistent set of units can be used. Solving for the film coefficient h, and assuming that the characteristic length, L, is 1, results in Equation (8), $$h=0.129k\{(g*\beta*\Delta T*C_p*\rho)/(v*k)\}^{1/3} \quad (8)$$

Relative values of h, therefore, can be calculated in order to compare different heat transfer fluids under different conditions.

Comparison of Thermophysical Properties

The following sections compare the heat transfer fluids used in our invention, containing 37% by weight potassium formate, with both ethylene and propylene glycol in a number of different properties. A sensitivity analysis of the film coefficient equation (8), using the temperature range from 60° F. to 180° F., typical operating conditions for line heaters, shows that the thermophysical parameters below are listed in their approximate importance to heat transfer in line heaters under typical operating conditions.

Thermal Conductivity.

This parameter is a measure of the ability of a substance to transfer heat through molecular transfer of energy. Conduction is the only mechanism for transferring heat through a solid material. When liquids are involved, the thermal conductivity is important in both conduction and convection heat transfer pathways, and is the most significant factor when comparing different fluid systems. Higher thermal conductivity values greatly increase heat transfer by both conduction and convection mechanisms.

Figure 3:
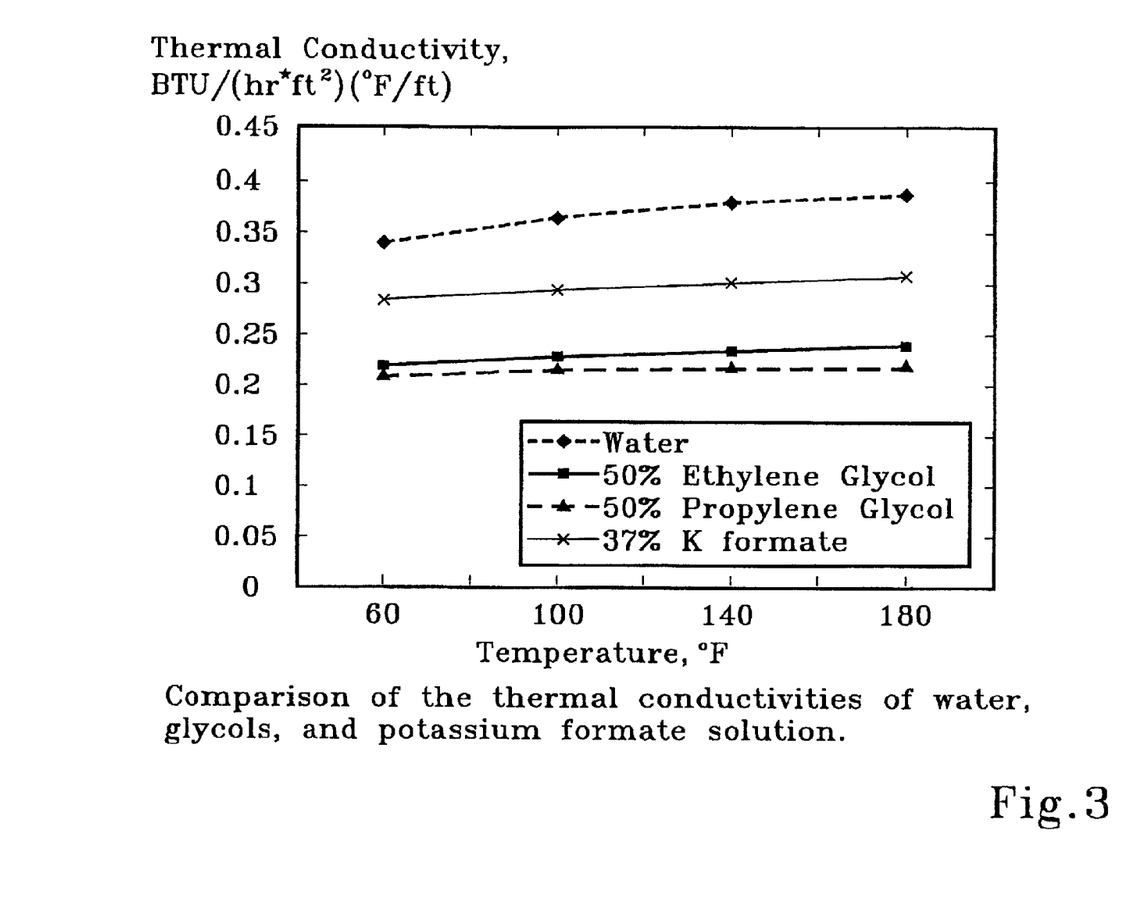
FIG. 3 is a graphic comparison of the thermal conductivities of our heat transfer fluid to those of water and certain glycol compositions.

FIG. 3 shows the thermal conductivities at different temperatures for the fluids being considered. Water has the highest k value, the novel heat transfer fluid is slightly lower, and the glycol solutions are much lower. The significant improvement in thermal conductivity of our novel heat transfer fluid explains much of the expected increase in heat transfer over glycol fluids.

Kinematic Viscosity.

The viscosity of a fluid determines its resistance to flow, and is most important on the lower temperature (cold) side of a heat transfer interface. A more viscous fluid is less able to move from the hot to the cold side, and therefore transfers heat more slowly by the convection process.

Figure 4:
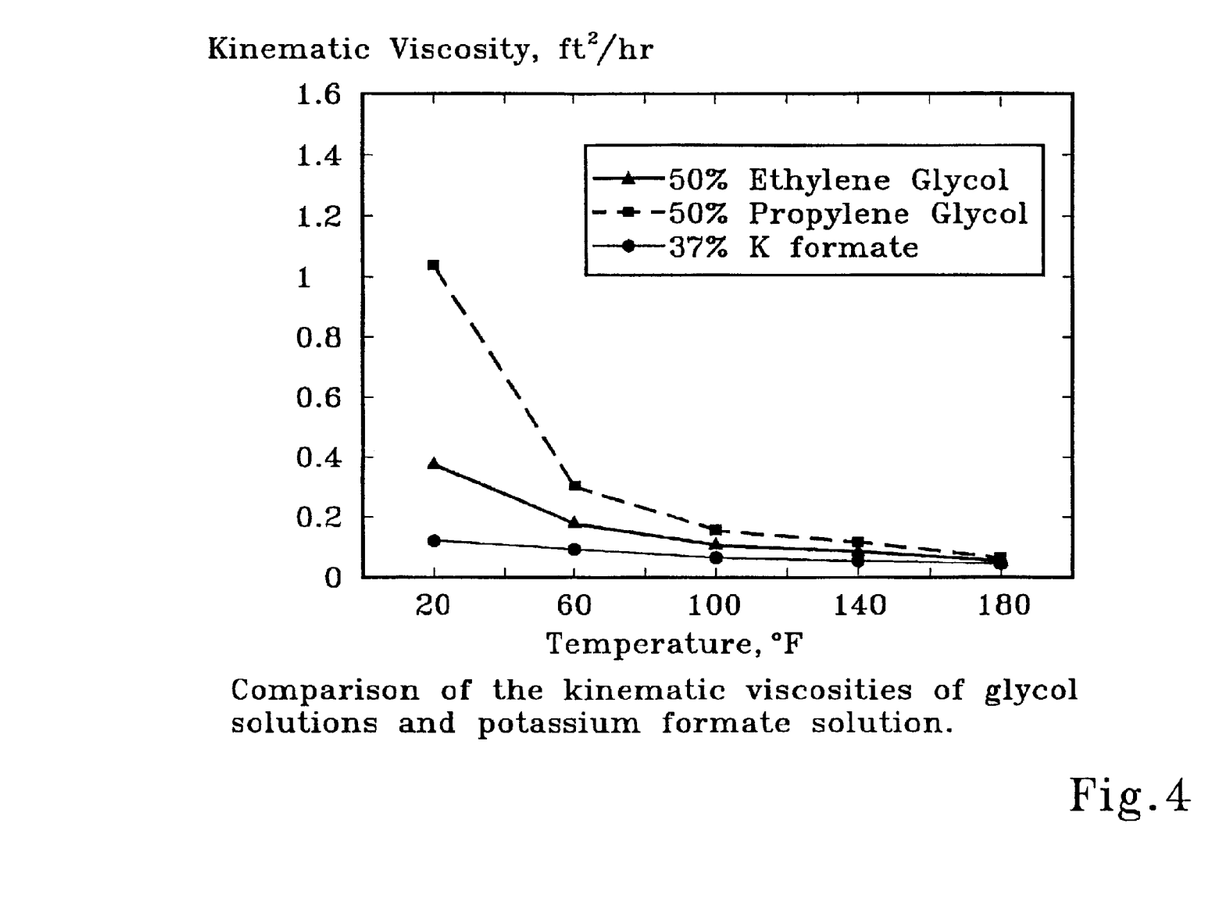
FIG. 4 graphically compares the kinematic viscosities of a preferred heat transfer composition of our invention with certain glycol solutions.

FIG. 4 compares the kinematic viscosities of the potassium formate heat transfer fluid of our invention with 50% solutions of ethylene or propylene glycol, and also with water. At higher temperatures, all the fluids have similar and fairly low viscosities. At temperatures below about 80° F., the glycol solutions rapidly increase in viscosity, and the differences increase further at lower temperatures. These higher viscosities restrict convection heat transfer in the glycols, particularly on the cold or process side of the line heater coil. Our heat transfer fluid has consistently low viscosities, even at the lower temperatures.

Specific Heat Capacity, $C_p$.

Figure 5:
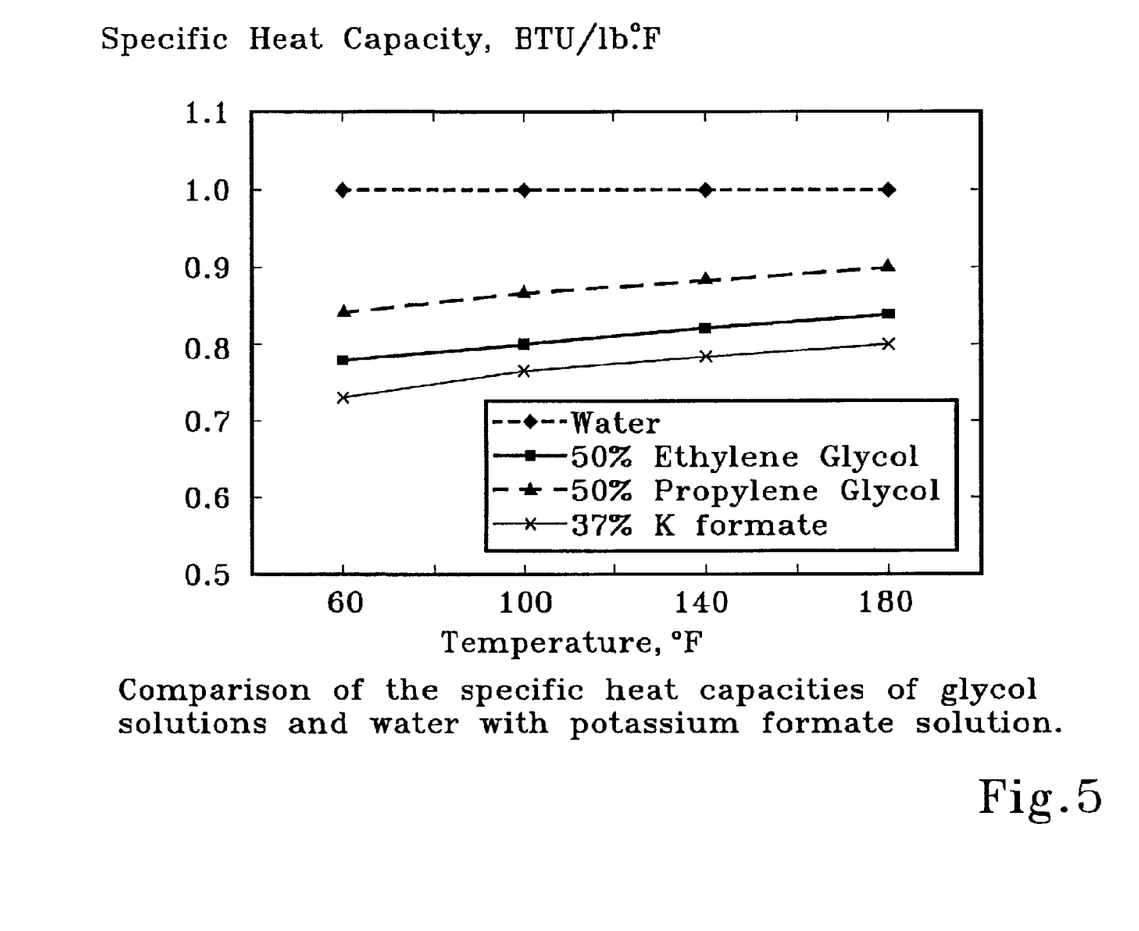
In FIG. 5, a preferred heat transfer fluid of our invention is compared graphically with glycol compositions and water in terms of specific heat capacities.

This parameter relates to a fluid's ability to "store" heat, and is defined in terms of energy per unit mass per degree temperature (BTU/lb.*° F.). A higher specific heat capacity increases the amount of heat a fluid carries as it transfers heat in the convection process. FIG. 5 shows the heat capacities of the various heat transfer fluids. Water has the highest heat capacity of the fluids compared, followed by the glycol solutions, and then by the new heat transfer fluid containing potassium formate. This would indicate better heat transfer for the glycols than our new heat transfer fluid on a per mass basis.

Figure 6:
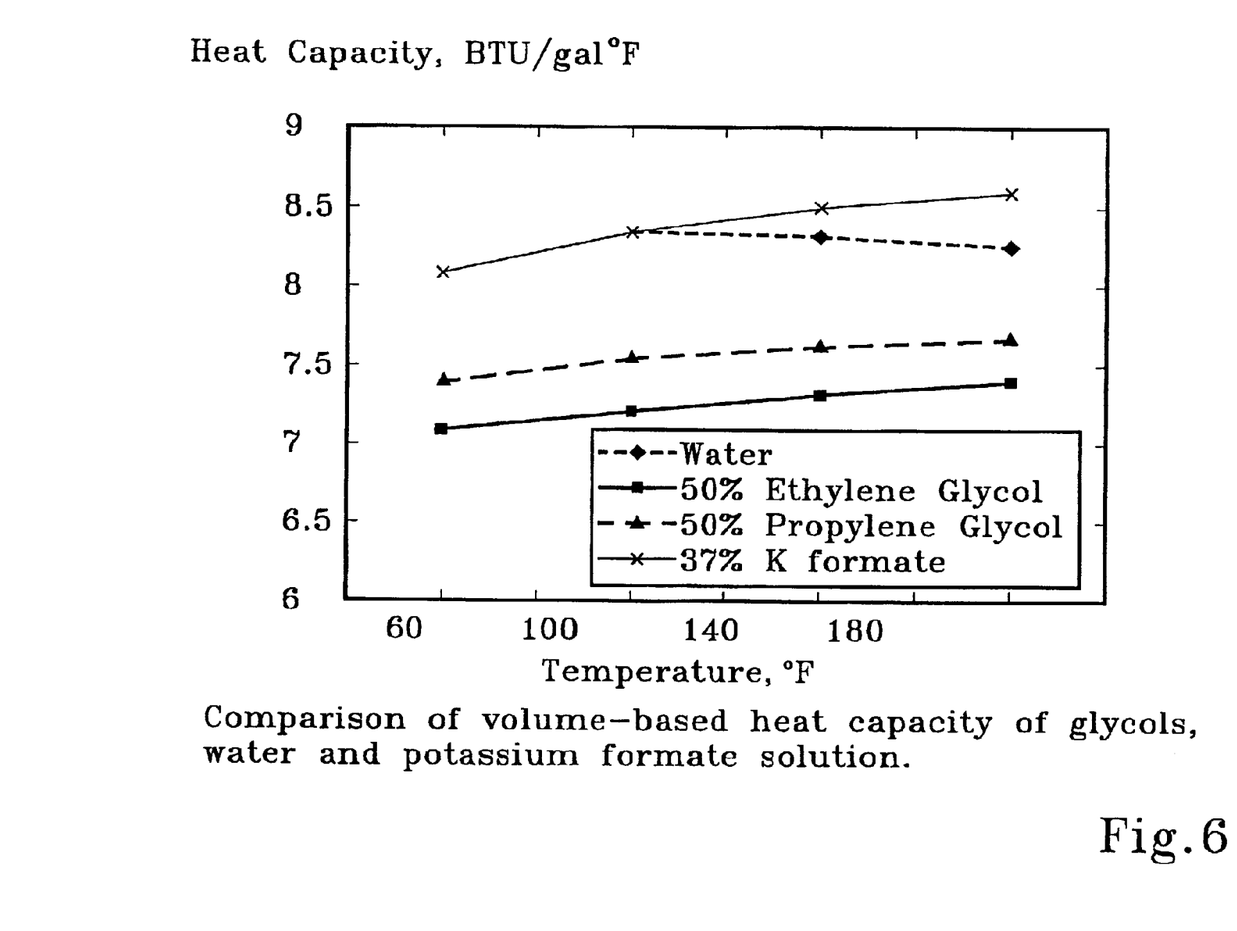
FIG. 6 compares heat capacities in terms of volume.

Line heaters, and most other enclosed heat transfer equipment, have a fixed volume of fluid, and so a more apt comparison would be on a volumetric heat capacity, defined as $C_p$ times the density. This converts the heat capacity per unit mass to one per unit volume. When the densities of the various fluids are factored in, the relative positions of the fluids change, and our heat transfer fluid has values similar to that of water, and superior to the glycol solutions, as illustrated in FIG. 6. The specific heat capacity on a mass basis is used in the film coefficient equation, but it is multiplied by the density (Equation 8), so this comparison is valid, and demonstrates the superiority of our heat transfer fluid in this area.

Thermal Expansion.

One of the driving forces in convective heat transfer is the density difference caused by expansion of the fluid with increasing temperature. This expansion causes colder fluids to have a lower density than warmer fluids. When acted on by the force of gravity, colder fluids tend to fall and warmer ones to rise. This motion of the fluid permits convection heat exchange to occur. Higher thermal expansion values increase heat transfer.

The degree of thermal expansion is defined by the expansion coefficient, $\beta$, in units of $1/T$. Glycols have higher expansion coefficients, on the order of $3.5 \times 10^{-4}/°$ F., than our potassium formate containing fluids (approximately $2.5 \times 10^{-4}/°$ F.), and water has the lowest value in the series (approximately $2.1 \times 10^{-4}/°$ F.). This favors the glycols slightly, though expansion coefficients that are too high can require large expansion tanks on the line heater to compensate for fluid expansion under changing temperatures. Because thermal expansion is one of the least significant parameters in determining the film coefficient, the advantage of glycols over the new heat transfer fluid here is minimized.

Properties Comparison.

Figure 7:
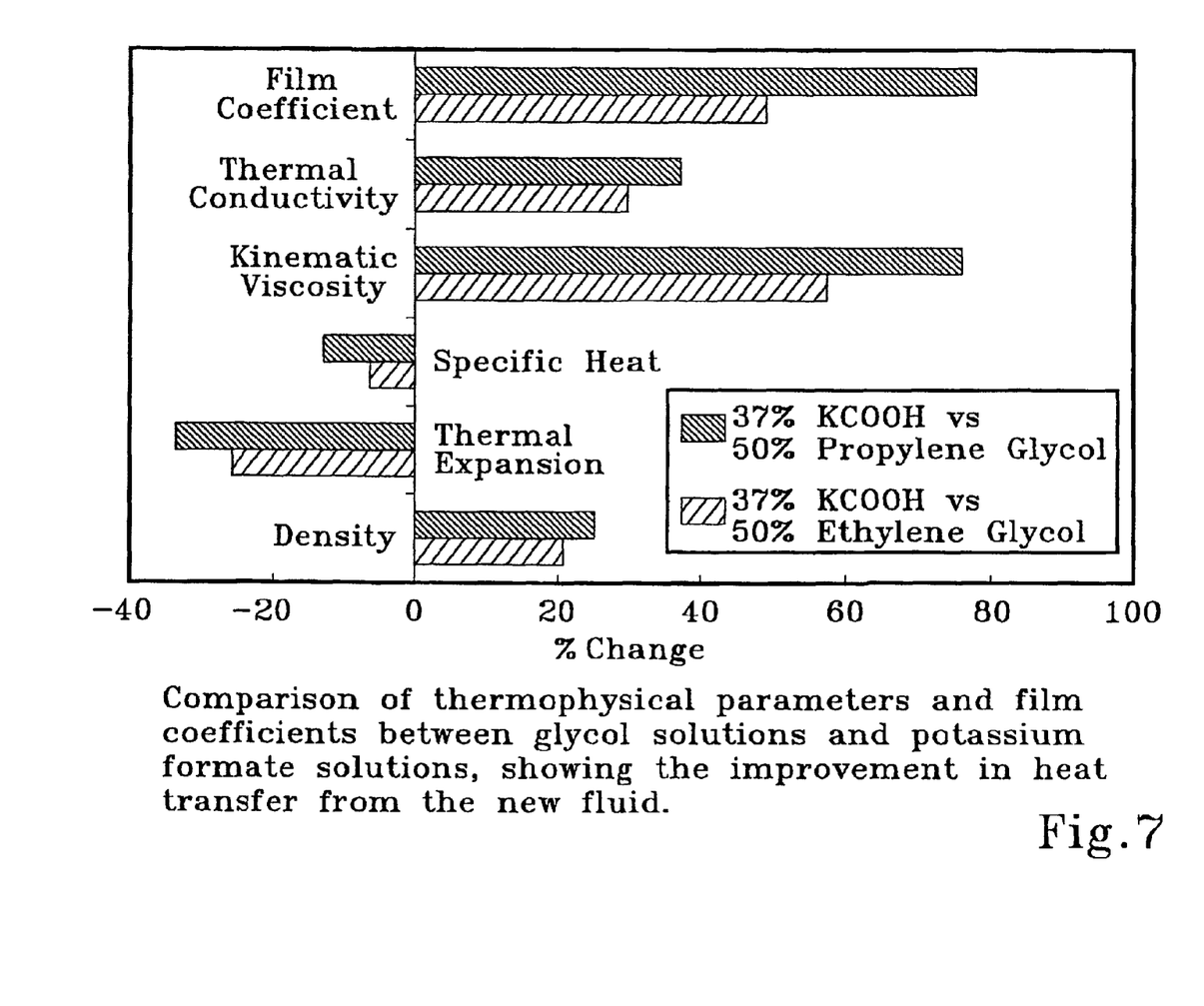
In FIG. 7, several thermophysical factors and coefficients are compared to demonstrate the relative significance of each in the context of our invention.
Figure 8:
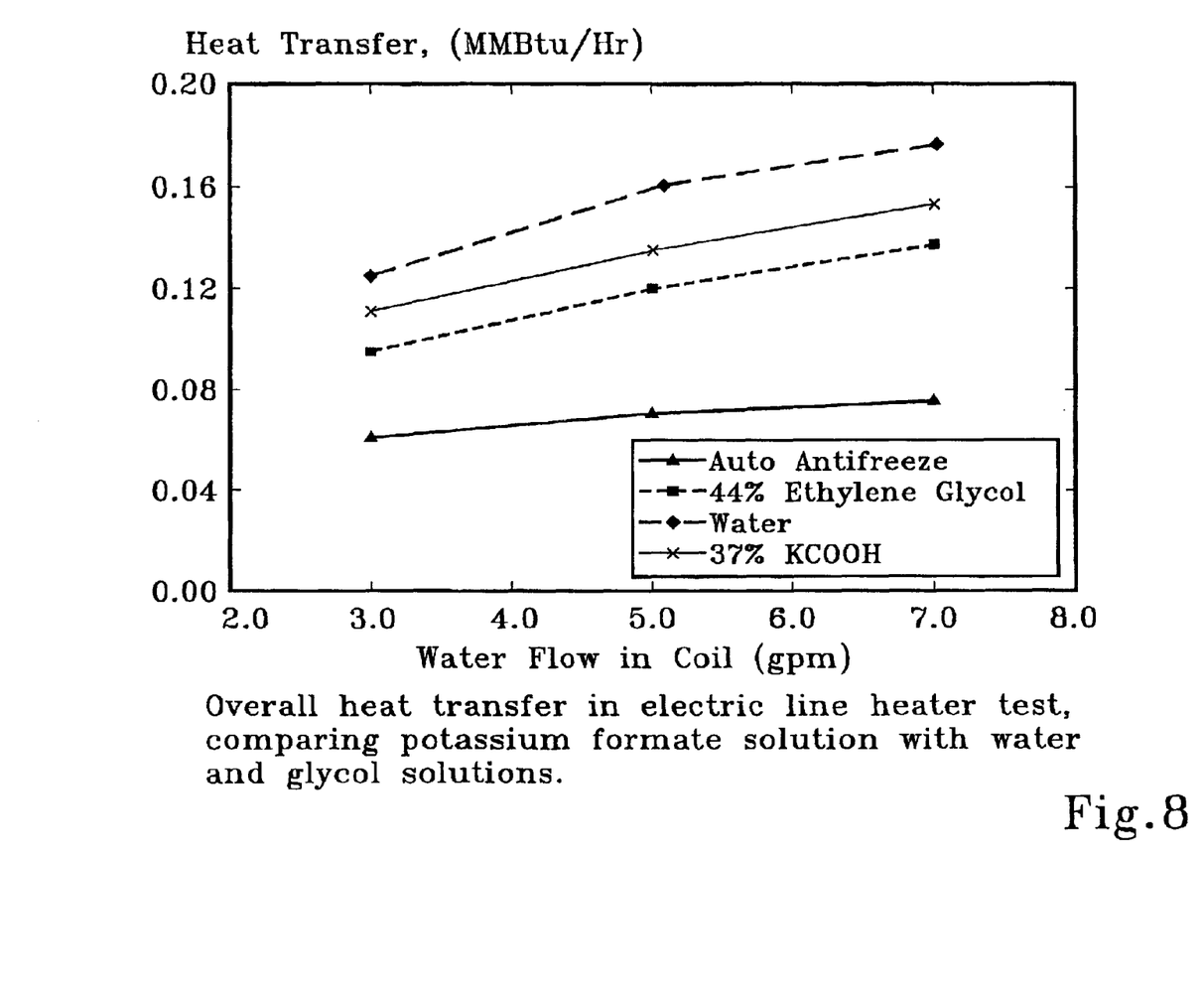
FIG. 8 compares overall heat transfer in a line heater using different heat transfer fluids.

Our new potassium formate heat transfer fluid has 30–37% better thermal conductivity and 57–76% lower viscosity when compared with 50% ethylene and propylene glycol solutions, respectively. The glycols have a 6–13% advantage in specific heat and 26–34% better thermal expansion coefficients; FIG. 7. In order to determine how these differences affect the film coefficient, we have chosen the example of a line heater operating at 180° F. bath temperature, with the process coil at a temperature of 60° F. When the individual thermophysical and other properties are used in the film coefficient equation (8), we can make an overall comparison between our heat transfer fluid, and ethylene and propylene glycol solutions, illustrated in the top bar in FIG. 7. Because of the greater importance of thermal conductivity and kinematic viscosity in the film coefficient, the potassium formate heat transfer fluid improves the heat transfer efficiency in this example by 49% over the ethylene glycol solution, and by 78% over the propylene glycol solution. Though this comparison shows the clear advantage that the new heat transfer fluid has over the glycols in heat transfer, it is important to note that the overall heat transfer capability of a system depends on a number of factors; see Equation (1). While the cold side film coefficient may be one of the more significant parts of the heat transfer equation, we expect the overall advantage of our heat transfer fluid might be somewhat less in field conditions than indicated, though still significant.

Thermophysical Properties of Potassium Acetate and Potassium Formate Solutions

Five water solutions of potassium acetate and seven solutions of potassium formate were made for thermal conductivity and specific heat determination. A heated probe technique was used for thermal conductivity measurement. Specific heat ($C_p$) values were measured using a differential scanning calorimeter.

In the heated probe method, which may be considered as a variant of the line source method, the line source and temperature sensor are combined in one small diameter probe. This probe is inserted into the sample and the heater turned on for a preselected time interval. During this time interval, the rate of heating of the probe is measured. This heating rate quickly becomes semi-logarithmic and from this semi-logarithmic rate the thermal conductivity of the sample is calculated. The data are collected by a computer-based digital data acquisition system and the heating rate displayed visually. The slope of the temperature curve versus ln time is chosen using cursors and the conductivity calculated is based on this portion of the curve. The method is traceable to AST Standard D5334-92.

Specific heat is measured using a standard Perkin-Elmer Model DSC-2 Differential Scanning Calorimeter with sapphire as the reference material. This instrument was calibrated using lead as the standard. The ASTM testing procedure followed was E1269. The standard and sample were subjected to the same heat flux as a blank and the differential powers required to heat the sample and standard at the same rate were determined using the digital data acquisition system. From the masses of the sapphire standard and sample, the differential power, and the known specific heat of sapphire, the specific heat of the sample is computed. The experimental data are visually the experiment progresses. All measured quantities are directly traceable to NIST standards.

The specific heat and thermal conductivity results are shown in Tables 2 and 3 for various concentrations of the potassium formate and potassium acetate solutions tested.

TABLE 2

Specific Heat Results

| Temperature | Specific Heat (J/gm/K.) | | | | | | |
|---|---|---|---|---|---|---|---|
| C. | 10% | 20% | 30% | 40% | 50% | 60% | 70% |
| Potassium Acetate | | | | | | | |
| 23 | 3.97 | 3.61 | 3.35 | 3.11 | 2.97 | | |
| 30 | 4.00 | 3.69 | 3.46 | 3.17 | 3.08 | | |
| 35 | 4.03 | 3.74 | 3.53 | 3.23 | 3.12 | | |
| 40 | 4.04 | 3.78 | 3.58 | 3.29 | 3.17 | | |
| 45 | 4.04 | 3.81 | 3.64 | 3.33 | 3.22 | | |
| 50 | 4.05 | 3.85 | 3.68 | 3.37 | 3.25 | | |
| 55 | 4.06 | 3.88 | 3.72 | 3.41 | 3.28 | | |
| 60 | 4.08 | 3.90 | 3.74 | 3.44 | 3.31 | | |
| Potassium Formate | | | | | | | |
| 23 | 3.92 | 3.69 | 3.19 | 2.91 | 2.64 | 2.47 | 2.29 |
| 30 | 3.98 | 3.75 | 3.23 | 2.96 | 2.71 | 2.53 | 2.36 |
| 35 | 4.00 | 3.79 | 3.26 | 3.00 | 2.74 | 2.54 | 2.40 |
| 40 | 4.03 | 3.82 | 3.29 | 3.02 | 2.78 | 2.57 | 2.43 |
| 45 | 4.05 | 3.86 | 3.31 | 3.04 | 2.81 | 2.60 | 2.47 |
| 50 | 4.08 | 3.88 | 3.34 | 3.06 | 2.84 | 2.61 | 2.49 |
| 55 | 4.09 | 3.91 | 3.36 | 3.08 | 2.87 | 2.63 | 2.51 |
| 60 | 4.10 | 3.93 | 3.38 | 3.09 | 2.89 | 2.65 | 2.53 |

Table 3 shows thermal conductivity as a function of concentration

TABLE 3

Thermal Conductivity Results

| Temperature | Thermal Conductivity (mW/cm/K.) | | | | | | | |
|---|---|---|---|---|---|---|---|---|
| C. | 0% | 10% | 20% | 30% | 40% | 50% | 60% | 70% |
| Potassium Acetate | | | | | | | | |
| 25 | 6.000 | 5.795 | 5.460 | 5.030 | 4.522 | 4.167 | | |
| 67 | 6.600 | 6.273 | 5.861 | 5.376 | 4.891 | 4.576 | | |
| Potassium Formate | | | | | | | | |
| 25 | 6.000 | 5.904 | 5.588 | 5.167 | 4.835 | 4.521 | 4.415 | 4.307 |
| 67 | 6.600 | 6.366 | 5.988 | 5.670 | 5.045 | 4.691 | 4.451 | 4.400 |

In addition to the thermophysical properties that provide an improved heat transfer performance for the invention, there are advantages that arise from operational, or use and handling, features. In the field operation of line heaters or other heat transfer systems, (a) freeze points, particularly in very cold climates, (b) pH and skin contact effects for the human handling issues, (c) volatility/boiling points, for reduction of emissions, and (d) the ability to operate heaters at higher temperatures are all advantages to our invention.

Operational Considerations

While heat transfer characteristics are a significant factor in evaluating fluids for line heaters, they are not the only consideration. Any fluid used in these systems must have favorable operational and handling properties. The ability to remain stable under a wide temperature range, keep corrosion low for an extended period of time, and permit maintenance additions of some of the product components, if necessary, is vital for a fluid to be accepted as a viable heat transfer product.

Freeze Points.

Heaters are sometimes taken out of service even in the winter high use months, for servicing or other reasons. The heat transfer fluid could then reach lower temperatures than normal use, down to −40° F. or lower in northern U.S. or Canadian climates. 50% ethylene glycol and propylene glycol solutions have freeze points of approximately −29° F. and −28° F., respectively. Higher glycol concentrations lower the freeze point more, though at the cost of increasing viscosity significantly, which negatively affects heat transfer. Our new potassium formate fluid has a freeze point at normal use concentration of −45° F., and can be formulated to remain liquid down to −75° F. without a significant effect on heat transfer efficiency.

Maintenance.

Over a period of time, thermal fluids can suffer loss of inhibitor, or pH drift that can negatively affect performance. In order to improve economics, it is preferable to be able to restore a fluid's effectiveness, rather than replace it with new fluid. Glycol-based systems permit maintenance to some degree, if they do not become too badly fouled or contaminated. Our new heat transfer fluid is preferably buffered to maintain pH in a favorable range, and can also be maintained by adding additional pH control products or corrosion inhibitor concentrate.

While we may use solutions of from 1% to 75% by weight potassium formate, we prefer to use solutions of 5% to 70%, and most preferably solutions of 20% to 50% potassium formate for most heating applications. Solution-treating additives (for corrosion inhibiting, scale prevention, and the like) which may be used include nonyl phenol ethoxylates, alkali metal carbonates, nitrates, and phosphates, alkyl amines, carboxylic acids, polycarboxylic acids, alkyl ureas, quaternary amine compounds, glycols and polyglycols.

What is claimed is:

1. A method of heating a fluid using a line heater, comprising:
   heating a solution comprising potassium formate in a solution heating zone in the line heater;
   circulating the solution to a fluid heating zone in the line heater to heat the fluid; and
   recirculating the solution to the solution heating zone.

2. The method of claim 1, wherein the fluid comprises natural gas.

3. The method of claim 1, wherein the potassium formate is made in situ by the reaction of potassium hydroxide and formic acid.

4. The method of claim 1, wherein the potassium formate is present in the solution in a concentration from about 1% to about 75% by weight.

5. The method of claim 1, wherein the potassium formate is present in the solution in a concentration from about 20% to about 50% by weight.

6. The method of claim 5, wherein the potassium formate solution includes at least 0.01% by weight sodium formate.

7. The method of claim 5, wherein the potassium formate solution includes about 0.01% to 10% by weight of potassium acetate.

8. The method of claim 7, wherein the solution further comprises 0.01% to 50% by weight of a glycol having up to 6 carbon atoms.

9. The method of claim 7, wherein the solution further comprises an effective amount of alkali metal halide to improve freeze resistance of the solution.

10. The method of claim 1, wherein the solution comprises about 5% to about 70% potassium formate and 0.01% to 5% corrosion inhibitor.

11. The method of claim 1, wherein the solution further comprises 0.01% to 40% by weight of at least one compound selected from the group consisting of ammonium formate, an alkali metal formate other than potassium formate, an alkali metal acetate, and ammonium acetate.

12. The method of claim 11, wherein the solution further comprises 0.01% to 40% by weight of at least one compound selected from the group consisting of a compatible corrosion inhibitor, sludge inhibitor, scale inhibitor, freeze point depressant, and pH regulator.

13. The method of claim 11, wherein the solution further comprises 0.01% to 40% by weight of at least one compound selected from the group consisting of nonyl phenol ethoxylates, alkali metal carbonates, nitrates, phosphates, alkyl amines, carboxylic acids, polycarboxylic acids, alkyl ureas, quaternary amine compounds, glycols, and polyglycols having up to 6 carbon atoms.

14. The method of claim 1, wherein the solution further comprises ammonium formate.

15. The method of claim 1, wherein the solution further comprises an alkali metal formate other than potassium formate.

16. The method of claim 1, wherein the solution further comprises ammonium acetate.

17. The method of claim 1, wherein the solution further comprises an alkali metal acetate other than potassium acetate.

18. The method of claim 1, wherein the solution further comprises 0.01% to 50% by weight of a glycol having up to 6 carbon atoms.

19. The method of claim 1, wherein the solution further comprises an effective amount of alkali metal halide to improve freeze resistance of the solution.

20. A method of heating a fluid using a line heater, comprising:
providing a solution comprising potassium formate;
heating the solution in a solution heating zone in the line heater;
circulating the solution to a fluid heating zone in the line heater;
transferring heat to the fluid; and
recirculating the solution to the solution heating zone.

21. The method of claim 20, wherein the potassium formate is present in the solution in a concentration from about 20% to about 50% by weight.

22. The method of claim 21, wherein the potassium formate solution includes at least 0.01% by weight sodium formate.

23. The method of claim 21, wherein the potassium formate solution includes about 0.01% to 10% by weight of potassium acetate.

24. The method of claim 23, wherein the solution further comprises 0.01% to 50% by weight of a glycol having up to 6 carbon atoms.

25. The method of claim 23, wherein the solution further comprises an effective amount of alkali metal halide to improve freeze resistance of the solution.

26. The method of claim 20, wherein the solution further comprises ammonium formate.

27. The method of claim 20, wherein the solution further comprises an alkali metal formate other than potassium formate.

28. The method of claim 20, wherein the solution further comprises ammonium acetate.

29. A method of heating a fluid using a line heater, comprising:
heating a solution comprising alkali metal formate in a solution heating zone in the line heater;
circulating the solution to a fluid heating zone in the line heater to heat the fluid; and
recirculating the solution to the solution heating zone.

* * * * *